W. F. NORTMAN, Jr.
FIREPROOF GUARD FOR CABLES, BELTS, AND OTHER FLEXIBLE TRANSMISSION ELEMENTS.
APPLICATION FILED MAR. 26, 1918.
1,318,796.
Patented Oct. 14, 1919.
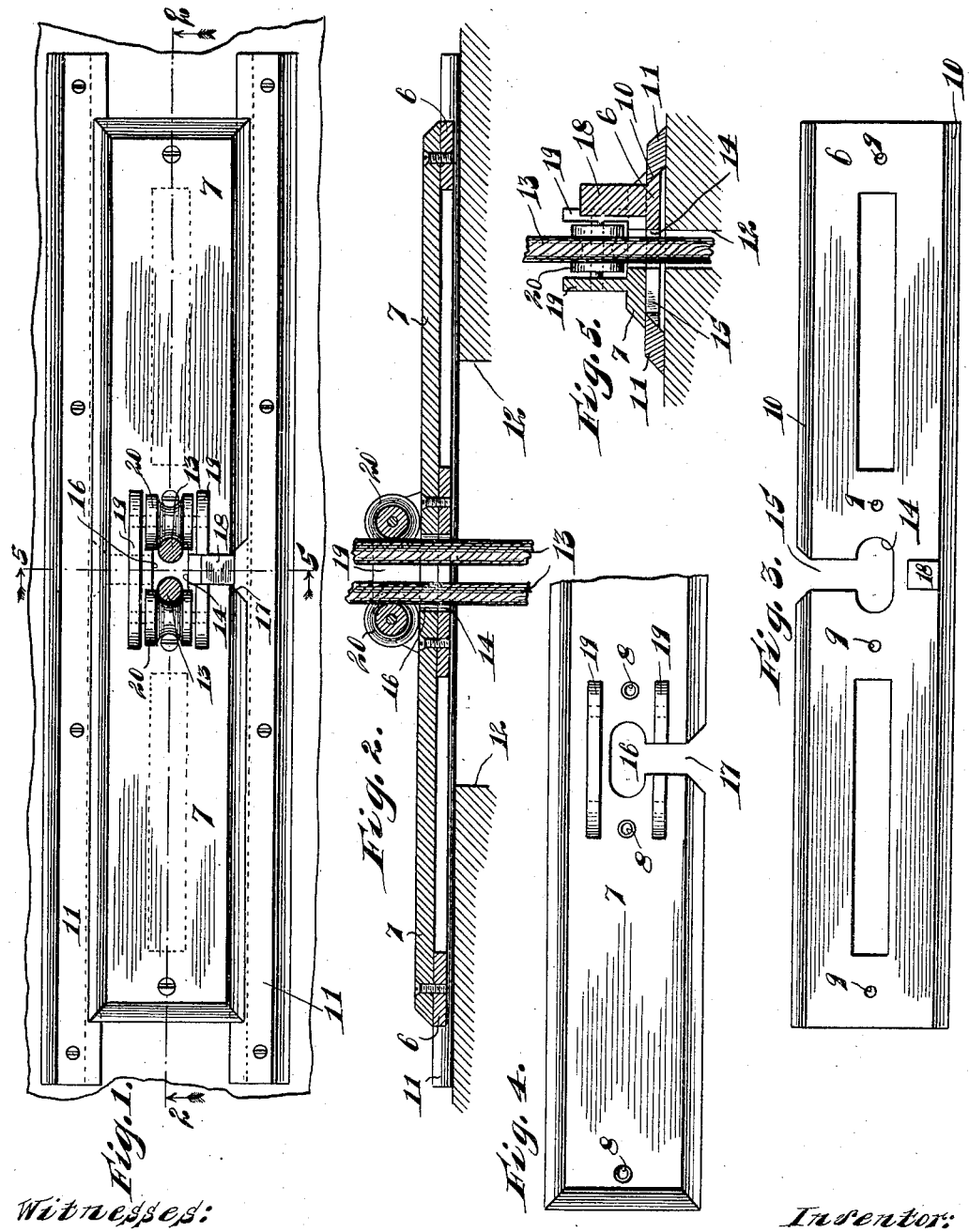

UNITED STATES PATENT OFFICE.

WILLIAM F. NORTMAN, JR., OF CHICAGO, ILLINOIS.

FIREPROOF GUARD FOR CABLES, BELTS, AND OTHER FLEXIBLE TRANSMISSION ELEMENTS.

1,318,796.  Specification of Letters Patent.  Patented Oct. 14, 1919.

Application filed March 26, 1918. Serial No. 224,858.

*To all whom it may concern:*

Be it known that I, WILLIAM F. NORTMAN, Jr., a citizen of the United States, and a resident of the city of Chicago, county of Cook, and State of Illinois, have invented certain new and useful Fireproof Guards for Cables, Belts and Other Flexible Transmission Elements, of which the following is a specification.

My invention relates to a certain new and useful fireproof guard for cables, belts and other flexible transmission elements, and has for its object the provision of means whereby the slots in a floor, wall or the like, for the passage of a cable, belt, or the like, may be guarded against the transmission of fire.

Other objects will appear hereinafter.

The invention consists in the combinations and arrangements of parts hereinafter described and claimed.

The invention will be best understood by reference to the accompanying drawings forming a part of this specification, and in which:

Figure 1, is a top plan view of a guard embodying the invention,

Fig. 2, a longitudinal section of the same taken on line 2—2 of Fig. 1,

Fig. 3, a top plan view of the bottom guard plate employed in the construction,

Fig. 4, a top plan view of a portion of the top guard plate employed in the construction, and Fig. 5, a section taken on line 5—5 of Fig. 1.

The preferred form of construction, as illustrated in the drawings comprises a lower guard plate 6 and an upward guard plate 7 having screw holes 8 therein registering with threaded sockets 9 in plate 6, whereby said plates may be detachably secured together in superposed relation. The longitudinal edges 10 of the plate 6 are inwardly and upwardly beveled, as indicated, to fit the overhanging beveled edges of guide strips 11 arranged to be secured to a floor, wall, or the like, on opposite sides of the slot 12 formed therein for the passage of cables 13, belts, or the like. The bottom plate 6 is provided with a central slot 14 adapted to accommodate and permit the free passage of the cables 13 and having a notch 15 leading thereinto, from one side of said plate and adapted to permit of the insertion of the cables in said slot. The top plate 7 is likewise provided with a central slot 16 adapted to accommodate the cables 13 and with a notch 17 leading thereinto from the opposite side. Said plates may be readily assembled on the cables 13 when separated, but disengagement from said cables is prevented when the plates are secured together. The bottom plate 6 is provided with a positioning lug 18 fitting in the notch 17, and top plate 7 is provided with perforated lugs or ears 19 constituting bearings for the mounting of guide rollers 20 for the cable strands 13.

In use, the guard is arranged about the strands of a cable, belt, or the like, where the same passes through a slot in a floor or wall, or the like, the composite guard plate 6—7 readily traveling with the lateral travel of the cables, belt, or the like, and protecting the slot from the transmission of fire.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having described by invention, what I claim as new and desire to secure by Letters Patent is:—

1. A device of the class described comprising a guide; and a plate mounted to reciprocate on said guide and slotted for the passage of a flexible element, said plate being made in two separable parts having notches in opposite edges leading into the slots therein, substantially as described.

2. A device of the class described comprising a guide; and a plate mounted to reciprocate on said guide and slotted for the passage of a flexible element, said plate being made in two separable parts having notches in opposite edges leading into the slots therein, and guide rollers on said plate on opposite sides of the slot therein, substantially as described.

3. A device of the class described comprising two guide strips having over-hanging and beveled adjacent edges; a guide plate mounted to reciprocate on said guide strips and slotted for the passage of a flexible element, said plate being made in two separable parts secured one over the other and having notches in opposite edges leading into the slots therein, the longitudinal edges of the under plate being beveled to fit the over-hanging edges of said guide strips; a positioning lug on the under plate fitting the notch in the upper plate; perforated ears on the upper plate on opposite sides of the slot therein; and guide rollers in said ears to contact with a flexible element, passing through said notch, substantially as described.

In testimony whereof I have signed my name to this specification in the presence of two subscribing witnesses.

WILLIAM F. NORTMAN, Jr.

Witnesses:
JOSHUA R. H. POTTS,
B. G. RICHARDS.